United States Patent [19]
Joshi

[11] Patent Number: 5,482,919
[45] Date of Patent: Jan. 9, 1996

[54] SUPERCONDUCTING ROTOR

[75] Inventor: Chandrashekhar H. Joshi, Bedford, Mass.

[73] Assignee: American Superconductor Corporation, Westborough, Mass.

[21] Appl. No.: 122,007

[22] Filed: Sep. 15, 1993

[51] Int. Cl.[6] .............................. H02K 9/00; H02K 9/22; F25B 9/00
[52] U.S. Cl. .................... 310/52; 310/64; 62/6; 505/878
[58] Field of Search ..................... 310/52, 61, 54, 310/58, 64; 62/6; 505/876, 877, 878, 894

[56] References Cited

U.S. PATENT DOCUMENTS

| | | | |
|---|---|---|---|
| 3,534,813 | 10/1970 | Fleming | 62/6 |
| 3,692,099 | 9/1972 | Nesbitt et al. | 62/6 |
| 4,079,273 | 3/1978 | Lambrecht et al. | 310/52 |
| 4,209,061 | 6/1980 | Schwemin | 62/6 |
| 4,223,239 | 9/1980 | Eckels | 310/52 |
| 4,642,495 | 2/1987 | Mori et al. | 310/52 |
| 4,727,724 | 3/1988 | Intichar et al. | 310/64 |
| 4,843,826 | 7/1989 | Malaker | 62/6 |
| 4,901,787 | 2/1990 | Zornes | 62/6 |
| 5,032,748 | 7/1991 | Sakuraba et al. | 310/52 |
| 5,090,206 | 2/1992 | Strasser | 62/6 |

FOREIGN PATENT DOCUMENTS

| | | |
|---|---|---|
| 448738 | 3/1990 | European Pat. Off. . |
| 3836959 | 5/1990 | Germany . |

*Primary Examiner*—Steven L. Stephan
*Assistant Examiner*—Clayton E. LaBalle
*Attorney, Agent, or Firm*—Choate, Hall & Stewart

[57] ABSTRACT

The superconducting rotor includes at least one field coil made of a superconductor material having a given superconducting transition temperature. A cryocooler system is mounted for rotation with the rotor. The cryocooler includes a cold head portion mounted in heat transfer relation with the field coil to cool the field coil to a temperature below its transition temperature and includes a piston/regenerator adapted to allow passage of a working fluid at a mass flow rate which is substantially uniform over the cross-section of the piston/regenerator during operation of the system. Heat is conducted away from the field coils by heat pipes or by conduction through high thermally conductive material. Mounting the cryocooler cold head for rotation with the rotor eliminates the use of a cryogenic liquid pool for rotor cooling.

27 Claims, 3 Drawing Sheets

SUPERCONDUCTING ROTOR

BACKGROUND OF THE INVENTION

This invention relates to the superconducting rotor of an electric motor and more particularly to cooling such a rotor to maintain its field coils in the superconducting state.

Superconducting rotating machines such as motors and generators must be cooled such that the field structures of their rotors are in the superconducting state. The conventional approach to cooling rotor field coils is to immerse the rotor in a cryogenic liquid. For example, a rotor employing conventional, low temperature superconducting materials must be immersed in liquid helium. Similarly, rotors employing field coils made of high temperature superconducting materials might be immersed in liquid nitrogen. In either case, heat generated by or conducted into the rotor is absorbed by the cryogenic liquid which undergoes a phase change to the gaseous state. Consequently, the cryogenic liquid must be replenished on a continuing basis. This replenishment is accomplished through a transfer line that feeds the cryogenic liquid into the rotating machine along the axis of the rotor. A rotating, cryogenic leak-tight seal is required in the transfer line. Rotating seals require surfaces which slide on one another in extremely close contact to prevent leakages. Since the surfaces rub, friction will wear them away and eventually create a gap. At room temperature, elastomers are used to eliminate this problem but there are no known materials which have suitable elastomeric properties at cryogenic temperatures. Consequently, rotating cryogenic leak-tight seals are available only as custom products and require frequent maintenance and parts replacement.

The dynamic stability of rotating systems employing a free liquid is difficult to maintain. Rotation can cause wave action resulting in a mechanical imbalance in the rotor. Further, because the liquid is in a rotating system, the rotational acceleration pressurizes the cryogenic fluid with the maximum pressure at the periphery of the machine. This pressurization causes the boiling point of the cryogenic liquid to be elevated. At atmospheric pressure, liquid nitrogen boils at 77 K. However, for a rotor 36 centimeters in diameter rotating at 3600 rpm, the boiling point is approximately 97 K., which is very close to or higher than the transition temperature of some ceramic oxide high temperature superconductors. Moreover, for such high temperature superconductors it is known that their performance is greatly enhanced at temperatures below the transition temperature. In the bismuth-strontium-calcium-copper oxide (BSCCO) 2223 system, for example, a three times higher magnetic field can be generated by cooling the superconductor to 50 K. as compared to the 77 K. of liquid nitrogen at atmospheric pressure.

Another approach for achieving cryogenic temperatures, though heretofore not in a rotating environment, is the cryogenic refrigerator or cryocooler. Cryocoolers are mechanical devices operating in one of several thermodynamic cycles such as the Gifford-McMahon cycle and the Stirling cycle. Cryocoolers have found application, for example, in cooling the stationary magnets in magnetic resonance imaging systems. See, for example, M. T. G van der Laan et al., "A 12 k superconducting Magnet System, Cooled via Thermal Conduction by Means of Cryocoolers", *Advances in Cryogenic Engineering, Volume 37, Part B,* (Proceedings of the 1991 Cryogenic Engineering Conference) edited by R. I/V. Fast, page 1517 and G. Walker et al., "Cryocoolers for the New High-Temperature Superconductors," *Journal of Superconductivity,* Vol. 1 No. 2, 1988. It is well known to those skilled in the art that good cryocooler performance depends on a design optimized for the actual conditions the cryocooler operates under. Known cryocoolers are not adapted for operation in a rotating environment because they usually do not have a rotational axis of symmetry or a fluid piston/regenerator designed to operate in a rotating environment.

SUMMARY OF THE INVENTION

The superconducting rotor according to one aspect of the invention includes a rotor with at least one field coil made of a superconductor material having a superconducting transition temperature. A cryocooler system including a cold head is mounted on the rotor for rotation with the rotor. The cold head is mounted on the rotor in a heat transfer relation with the coil so as to cool the coil to a temperature below its transition temperature. The cryocooler may be a single stage or a multi-stage device. In a preferred embodiment, the field coil and the cold head are both in intimate thermal contact with a structure having a high coefficient of thermal conductivity. In another embodiment, at least one heat pipe is disposed between the coil and the cold head for conducting heat away from the coil. In these embodiments a non-rotating compressor is provided for delivering a high pressure working fluid nominally at ambient temperature to the cold head and for receiving lower pressure working fluid from the cold head. The compressor and cold head are in fluid communication through a rotary joint which is at room temperature. It is preferred that the high pressure working fluid be conveyed in a first line disposed within a second line which also conveys the lower pressure working fluid.

In yet another aspect of the invention, the compressor along with the cold head is mounted for rotation with the rotor. In this embodiment, the compressor receives electrical power through electrically conducting sliprings.

In all of these embodiments it is preferred that the cryocooler system have a longitudinal axis coincident with the axis of rotation of the rotor to which it is attached. It is also preferred that the longitudinal axis of the cryocooler be an axis having rotational symmetry to assure acceptable rotational performance. When the dominant cooling mode is heat conduction through structure supporting the field coil and the cryocooler, the structure may include a plurality of axially spaced apart annular members connected by axially extending longitudinal members having high thermal conductivity properties.

The cryocooler forming a part of the present invention includes a reciprocating piston/regenerator which may be driven by a linear motor assembly or a voice coil system and which includes a piston/regenerator adapted to allow passage of a working fluid at a mass flow rate which is uniform over the cross-section of the piston/regenerator during operation of the system. The cryocooler may operate on any appropriate thermodynamic cycle such as the Gifford-McMahon cycle and the Stirling cycle. Suitable working fluids are helium, neon, nitrogen, hydrogen and oxygen.

The superconductor material forming the field coil may be either conventional, low temperature superconductors such as niobium-tin having a transition temperature below 35 K. or a high temperature superconductor having a transition temperature above 35 K. Suitable high temperature superconductors for the field coils are members of the bismuth-strontium-calcium-copper oxide family, the yttrium-bariumcopper oxide system, mercury based materials and thallium-based high temperature superconductor materials. The cryocooler characteristics are selected to provide a rotor temperature below the transition temperature of the superconductor and, preferably, well below the transition temperature of the superconductor.

Because the present invention employs a cryocooler mounted for rotation with the rotor, there is no pool of liquid to disturb the dynamic balance of the system. Further, by using heat pipes or highly thermally conductive material temperature gradients within the field coil are reduced. The present invention also eliminates a cryogenic rotary joint. Importantly, the cryocooler can cool the field coil well below the transition temperature of the superconductor.

DESCRIPTION OF THE PREFERRED EMBODIMENT

Figure 1:
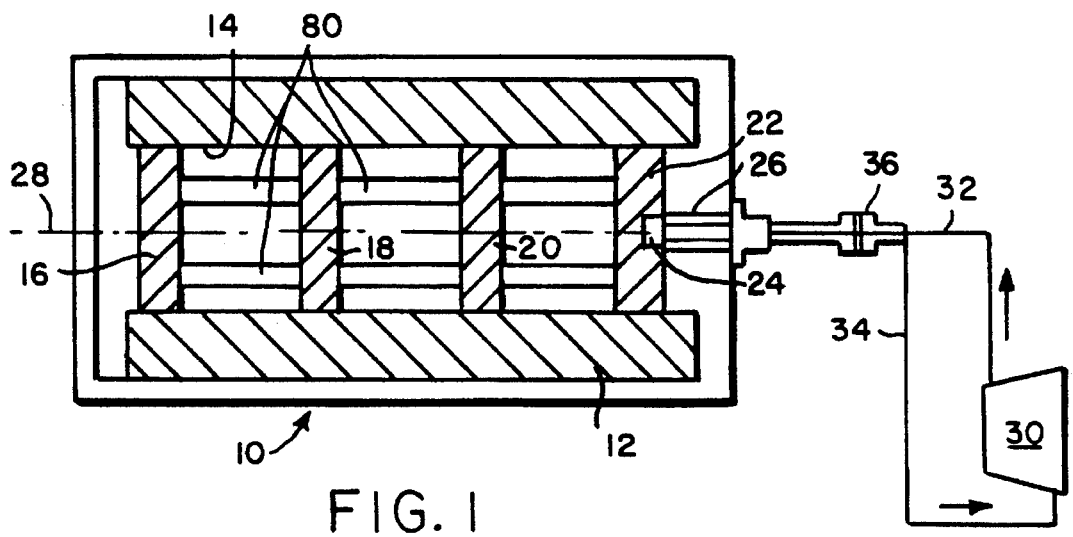
FIG. 1 is a cross-sectional view of the superconducting rotor of the present invention.

With reference first to FIG. 1, a superconducting rotor 10 includes a field coil winding 12 supported on a mandrel 14. The field coil winding 12 is preferably made of a high temperature superconducting wire material such as material available from the American Superconductor Corporation of Westborough, Mass. Other suppliers of suitable superconducting materials are IGC of Guilderland, N.Y. and Sumitomo Electric of Japan. Appropriate superconductors may be selected from the known classes of high temperature superconducting materials. The field coil winding 12 may also be made from conventional, low temperature superconductors. The embodiment of FIG. 1 includes a plurality of spaced apart, annular members 16, 18, 20 and 22 which are in close mechanical and thermal contact with the coil 12 and the mandrel 14 on which the field coil winding 12 is wound. Both the annular members 16–22 and the mandrel 14 are made of high thermal conductivity material such as copper. The mandrel 14 and annular members 16–22 also provide mechanical rigidity to the entire coil structure which is subjected in operation both to substantial centrifugal and magnetic forces.

A cold head end 24 of a cryocooler assembly 26 is disposed within a recess in the angular member 22. It is preferred that an axis of symmetry of the cryocooler 26 be coincident with the axis of rotation 28 of the rotor 10. As will be described in more detail below, the cryocooler 26 receives a high pressure working fluid from a compressor 30 through a line 32. Lower pressure working fluid is returned to the compressor 30 through a line 34. The lines 32 and 34 are in fluid communication with the cryocooler 26 through a rotary coupling or junction 36.

During operation, the cold head 24 will extract heat both from the annular member 22 and, because of the highly thermally conducting nature of the interconnecting structure, from the field coil winding 12. In this embodiment, the compressor 30 does not rotate with the rotor 10.

Figure 2:
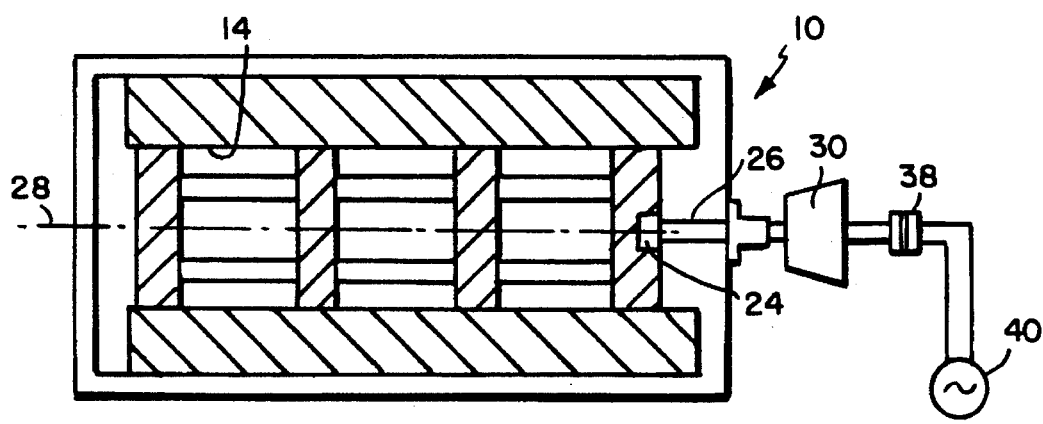
FIG. 2 is a cross-sectional view of an embodiment of the superconducting rotor according to the present invention including a compressor which rotates with the rotor.

FIG. 2 shows an embodiment of the invention in which both the cryocooler 26 and the compressor 30 are mounted for rotation with the rotor 10. An electrically conducting slip-ring assembly 38 allows electricity to be transported to the compressor 30 from a non-rotating source of electrical energy 40. The embodiment of FIG. 2 obviates the fluid rotary joint 36 of the embodiment of FIG. 1.

As is well understood, cryocoolers such as the cryocooler 26 is a refrigeration device in which cooling is accomplished by rapid expansion of compressed working fluid and may be designed to operate according to a number of thermodynamic cycles such as the Gifford-McMahon cycle, the Stirling cycle or a variation on the Stirling cycle known as the pulse-tube cycle. Cryocoolers operating on any of these cycles or on any other thermodynamic principles that will provide the desired low critical temperatures may be used in practicing the present invention.

Figure 3:
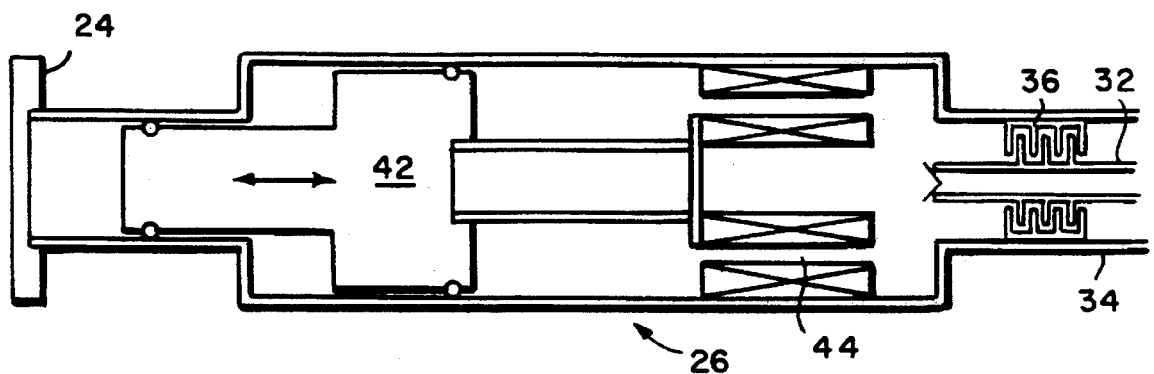
FIG. 3 is a schematic cross-sectional view of a two-stage cryocooler in accordance with one embodiment of the invention.

The cryocooler 26 is shown schematically in FIG. 3. A high pressure working fluid such as helium or neon is supplied via the line 32 to the interior of the cryocooler 26 through the rotary joint 36. A piston/regenerator element 42 reciprocates within the cryocooler 26. The piston/regenerator is caused to reciprocate by a linear motor assembly 44. Lower pressure working fluid returns to the compressor 30 via the line 34. As those skilled in the art will appreciate, upon reciprocation of the piston/regenerator 42, the cold head 24 is cooled and will remove heat from its surroundings. Cryocoolers which are commercially available from a number of manufacturers including Edwards Vacuum of Wilmington, Mass., CTI Cryogenics of Manfield, Mass., and Cryomech Corporation, and Carrier Corporation, both of Syracuse, N.Y., may be modified to operate in accordance with the invention by, for example, modifying the drive configuration as described in relation to either FIGS. 3 and 4 or FIG. 5 and additionally modifying the fluid piston/regenerator system as described in relation to FIG. 7 below.

Figure 4:
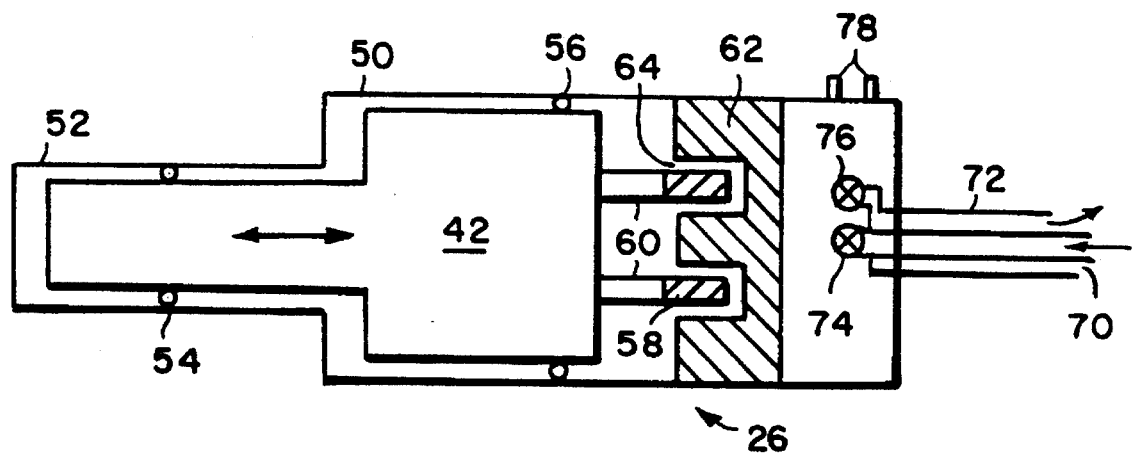
FIG. 4 is a cross-sectional view of a two-stage rotatable cryocooler.

With reference now to FIG. 4, the cryocooler 26 is shown in more detail. This cryocooler 26 is a two stage cryocooler including a first stage expander portion 50 and a second stage expander portion 52. Annular seals 54 and 56 form a sealing relationship with the piston/regenerator 42. The piston/regenerator 42 is affixed to a moving coil assembly 58 by means of a connector 60. A permanent magnet structure 62 includes a groove 64 into which the moving coil 58 may move without interference. A high pressure working gas (not shown) is introduced into the cryocooler 26 through a line 70 and lower pressure return working gas flows through a line 72. Flow of the high pressure gas is controlled by a valve 74 and flow of the low pressure working gas is controlled by a valve 76.

The cryocooler of FIG. 4 has two stages of cooling at different temperatures. The first stage employing the first stage expander 50 portion operates at a higher temperature and rejects heat to the ambient temperature environment and the second stage employing the second stage expander 52 operates in the temperature range of 20–80 K. rejecting heat to the first stage portion. Continuous cooling is accomplished by the expansion of the working gas in the two expanders 50 and 52 through the oscillatory motion of the piston/regenerator 42 and the appropriate opening and closing of the valves 74 and 76 which will be discussed below.

The oscillatory motion of the piston/regenerator 42 is accomplished in this embodiment by the voice coil assembly illustrated. The moving coil 58 is solenoidal in geometry. The moving coil interacts with the permanent magnet structure 62 which is made of any ferromagnetic material having the ability to remain magnetized. Suitable materials are iron, SmCo, NdFe, B, etc. The permanent magnet structure 62 is magnetized in such a way as to have a radially oriented permanent field in the annular groove 64. The moving coil 58 is excited by an alternating current through sliprings 78. A force proportional to the product of the current through the moving coil 58 and the magnetic field in the annular groove is imposed on the moving coil 58 resulting in oscillatory motion of the piston/regenerator 42.

The cryocooler assembly 26 is connected to an external source of compressed gas (not shown) via the pair of concentric pipes 70 and 72. This concentric pipe arrangement is connected to the pair of electrically actuated valves 74 and 76 to control the flow of gas into and out of the cryocooler 26. The timing sequence for the valves 74 and 76 will now be described.

With the piston/regenerator 42 in the leftmost position, high pressure gas valve 74 is opened. Gas flows into the cold head through the piston/regenerator 42, cooling during its passage, and pressurizes the expander portions. The valve 74 is then closed and the piston/regenerator 42 moves to the right expanding the gas in both expander stages. This expansion causes the gas to cool further. The valve 76 is then opened as the piston/regenerator 42 moves to the left. The gas absorbs heat from the superconducting rotor to which it is thermally connected. The gas flows through the piston/regenerator 42 and then back to the compressor (not shown in FIG. 4). The valve 76 is then closed with the cycle repeating thereafter. The entire assembly 26 is built having a common axis of symmetry which enables its operation in both a static and a rotating environment.

Figure 7:
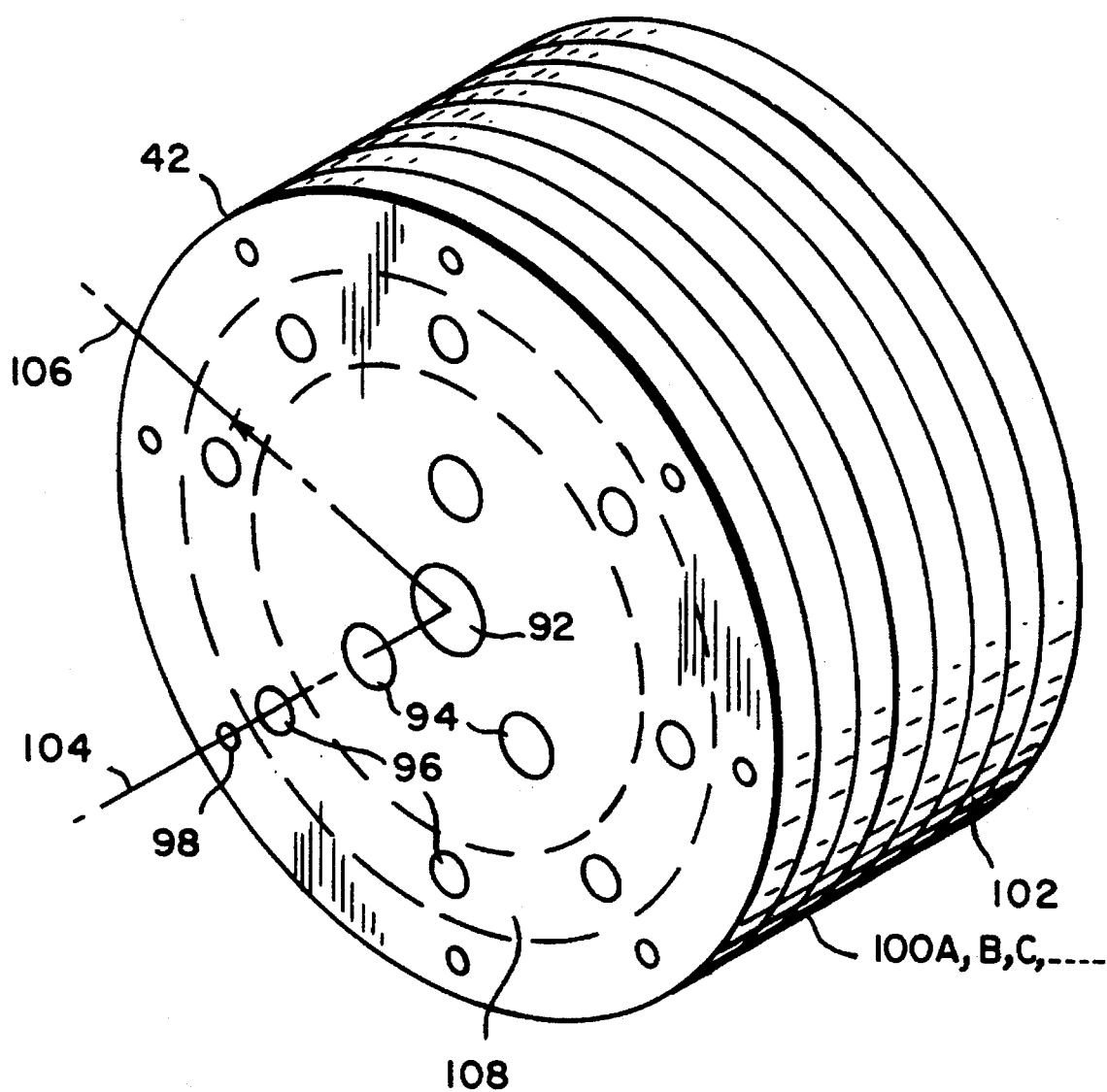
FIG. 7 is a perspective view of a piston/regenerator in accordance with a preferred embodiment of the invention.

The piston/regenerator has a set of axially oriented passages adapted to allow passage of the working fluid at a mass flow rate which is substantially uniform over the cross-section of the piston/regenerator during operation of the system. In the preferred embodiment, the sizes and spacing of these passages are such that the total cross sectional area of the openings in a unit area of the piston/regenerator varies in a substantially inverse relation with the radial position, and most preferably, substantially inversely with the fourth power of the radial position, of the passage measured from the axis of symmetry of the piston/regenerator. For example, as shown in FIG. 7, the piston/regenerator 42, is composed of, for example, a stack of high thermal conductivity perforated or porous disks 100(A),(B), . . . separated by low thermal conductivity perforated or porous separators 102(A),(B), . . . . For perforated disks and separators, the perforations should be substantially aligned in an axial direction to provide a path for continuous fluid flow through the piston/regenerator. The piston/regenerator 42 provides a composite structure which has a high radial thermal conductivity but a low axial thermal conductivity. The disks 100 may be made of any materials which have high thermal conductivity and high heat capacity, such as copper, silver or other highly conductive metals, alumina, magnesia or other thermally conductive ceramics, and phase transition materials such as ferromagnetic materials with Curie temperatures in the operating temperature range of the piston/regenerator. The separators 102 may be made from plastics such as perforated Mylar# or Teflon™, wood, paper, or any other low conducting permeable material. The spacing and size of the openings 92, 94(A)–(C), 96(A)–(F), and 98(A)–(H) in each disk is varied so that the total flow area at each radius, such as the area 108 encompassing openings 96(A)–(F) at radius 106, decreases substantially inversely as the fourth power of that radius measured from the axis of symmetry 104 of the piston/regenerator. Thus, during operation of the piston/regenerator 42 in a rotating environment, the mass flow rate of the fluid is substantially uniform over the cross section of the piston/regenerator.

Figure 5:
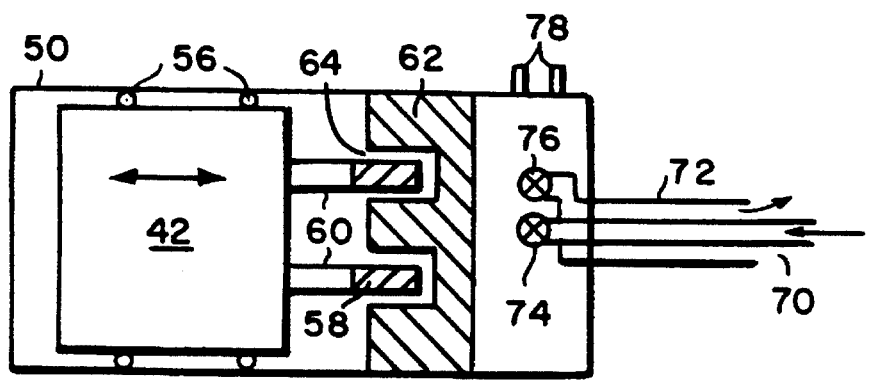
FIG. 5 is a schematic, cross-sectional view of a single stage rotatable cryocooler in accordance with another embodiment of the invention.

FIG. 5 is an embodiment of a cryocooler having just a single stage. This single stage device operates similarly to the two stage embodiment described above with respect to FIG. 4.

Figure 6:
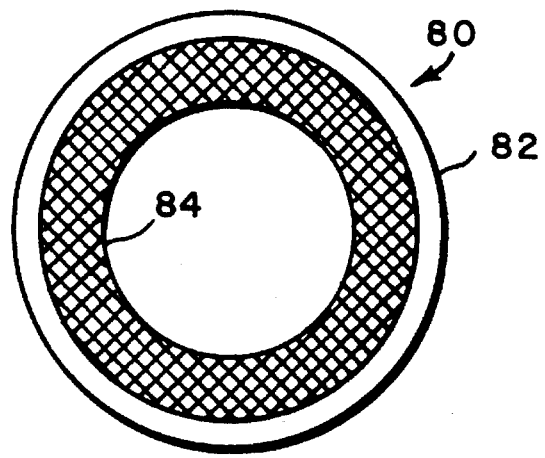
FIG. 6 is a cross-sectional view of a heat pipe used in the invention.

With reference again to FIG. 1, the spaced apart annular members 16–22 may be interconnected by a plurality of heat pipes 80. A cross-sectional view of a representative heat pipe 80 is shown in FIG. 6. The heat pipe 80 includes a highly thermally conductive tube 52 which is sealed at its ends. Suitable materials for the tube 82 are high strength copper, or aluminum alloys. The inner wall of the tube 84 is lined with a porous wick material 84 and the tube also includes a cryogenic working fluid (not shown) such as helium, neon or nitrogen. In a preferred embodiment, the wick material 84 is sintered ceramic. Other wick materials such as fine woven metallic mesh, fibrous cloths or sintered metal powders may also be used. The quantity of cryogenic working fluid in the heat pipe 80 is selected such that given the total internal volume of the heat pipe 80, approximately 5–25% of the cryogenic working fluid will be condensed and in liquid form at the desired operating temperature.

In operation, working fluid within the heat pipe 80 condenses at the end adjacent to the cold head 24. The condensed working fluid travels by capillary action along the wick 84 absorbing heat as it travels. It undergoes a phase transition to the vapor state and travels through the center of the heat pipe 80 back to the cold end adjacent to the cold head 24. Because the heat pipes 80 are in intimate thermal contact with the annular members 16–22, heat in the field coil windings 12 will be removed so that the windings 12 are maintained below the critical temperature of the superconductor material from which they are made.

With reference again to FIGS. 3, 4 and 5 a preferred working fluid within the cryocooler 26 is neon. Although lower temperatures (e.g., about 20 K.) can be obtained with helium as the working fluid, the heavier neon gas makes operation of the compressor 30 and of the piston/regenerator 42 more efficient. Further, the larger atomic volume of neon reduces leakage at the transfer coupling 36. Nitrogen is another suitable working fluid for the cryocooler 26. Neon is also the preferred working fluid within the heat pipe 80 for working temperatures in the 30–40 K. range.

In other embodiments, highly thermally conductive rods (e.g., copper) may be substituted for the heat pipes 80. Such rods or the heat pipes 80, of course, may be embedded directly within the field coil windings 12, if necessary to improve heat transfer.

What is claimed is:

1. Superconducting rotor system comprising:

a rotor including at least one field coil made of a superconductor material having a superconducting transition temperature; and a cryocooler system including a cold head mounted for rotation with the rotor, the cold head in heat transfer relation with the coil to cool the coil to a temperature below its transition temperature and comprising a piston/regenerator adapted to allow passage of a working fluid at a mass flow rate which is substantially uniform over the cross-section of the piston/regenerator during operation of the system.

2. Superconducting rotor system comprising:

a rotor including at least one field coil made of a superconductor material having a superconducting transition temperature; and a cryocooler system mounted for rotation with the rotor, the system including a cold head and a compressor, the cold head in heat transfer relation with the coil to cool the coil to a temperature below its transition temperature comprising a piston/regenerator adapted to allow passage of a working fluid at a mass flow rate which is substantially uniform over the cross-section of the piston/regenerator during operation of the system.

3. The system of claim 1 or claim 2 wherein the coil and the cold head are in thermal contact with structure having a high coefficient of thermal conductivity.

4. The system of claim 1 or claim 2 further including at least one heat pipe disposed between the coil and the cold head.

5. The system of claim 1 further including a non-rotating compressor for delivering high pressure working fluid to the cold head and for receiving lower pressure working fluid from the cold head.

6. The system of claim 5 wherein the compressor and cold head are in fluid communication through a rotary joint.

7. The system of claim 5 wherein the high pressure working fluid is conveyed in a first line disposed within a second line which conveys the lower pressure working fluid.

8. The system of claim 3 wherein the structure is adapted to support the coil and includes a plurality of axially spaced apart annular members connected by axially extending longitudinal members.

9. The system of claim 4 wherein a portion of the heat pipe is embedded in the coil.

10. The system of claim 2 wherein the compressor is powered by electricity delivered through an electrical slip-ring coupling.

11. The system of claim 1 or claim 2 wherein the cold head and the rotor have coincident longitudinal axes.

12. The system of claim 1 or claim 2 wherein the cold head includes a reciprocating piston/regenerator driven by a linear motor assembly.

13. The system of claim 1 or claim 2 wherein the cryocooler system is a two stage cryocooler.

14. The system of claim 1 or claim 2 wherein the cryocooler system is a single stage cryocooler.

15. The system of claim 1 or claim 2 wherein the superconducting material has a transition temperature below 35 K.

16. The system of claim 1 or claim 2 wherein the superconducting material has a transition temperature above 35 K.

17. The system of claim 1 or claim 2 wherein the working fluid is selected from the group comprising helium, neon, nitrogen, hydrogen and oxygen.

18. The system of claim 1 or claim 2 wherein the cryocooler system operates on a thermodynamic cycle selected from the group comprising the Gifford-McMahon cycle, the Stirling cycle and the pulse tube cycle.

19. Superconducting rotor system comprising:

a rotor including at least one field coil made of a high temperature superconductor material having a superconducting transition temperature;

a compressor and a cryocooler cold head including a reciprocating piston/regenerator adapted to allow passage of a working fluid at a mass flow rate which is substantially uniform over the cross-section of the piston/regenerator during operation of the system, the cold head and compressor mounted for rotation with the rotor, the cold head in heat transfer relation with the coil to cool the coil to a temperature below its transition temperature.

20. The system of claim 1 or claim 2 or claim 19 wherein the cryocooler system maintains the temperature of the coil below 77k.

21. The system of claim 1 or claim 2 or claim 19 wherein the cryocooler system maintains the temperature of the coil below approximately 50 K.

22. The system of claim 4 wherein the heat pipe includes a wick material on its inside surface.

23. The system of claim 1 or claim 2 or claim 19 wherein the superconductor material is a superconducting ceramic oxide.

24. The system of claim 1 or claim 2 wherein the piston/regenerator includes a plurality of axially oriented passages, the sizes and locations of the passages selected to provide the substantially cross-sectionally uniform working fluid mass flow rate.

25. The system of claim 24 wherein the total cross-sectional area of the passages at a radial position varies in a substantially inverse relation to radial position of the passage measured from the axis of symmetry of the piston/regenerator.

26. The system of claim 1 or claim 2 wherein the piston/regenerator has a high radial thermal conductivity and a low axial thermal conductivity.

27. The system of claim 26 wherein the piston/regenerator comprises a plurality of high thermal conductivity disks, each disk spaced from an adjacent disk by a low thermal conductivity separator.

* * * * *